(12) United States Patent
Gignoux et al.

(10) Patent No.: US 8,864,472 B2
(45) Date of Patent: Oct. 21, 2014

(54) METHOD OF REPAIRING OR REWORKING A TURBOMACHINE DISK AND REPAIRED OR REWORKED TURBOMACHINE DISK

(75) Inventors: Herve Gignoux, Vaux le Penil (FR); Eric Gvozdenovic, Coutencon (FR); Gael Loro, Combs la Ville (FR); Alain Jacques Michel Bassot, Bois le Roi (FR)

(73) Assignee: SNECMA, Paris (FR)

( * ) Notice: Subject to any disclaimer, the term of this patent is extended or adjusted under 35 U.S.C. 154(b) by 866 days.

(21) Appl. No.: 13/054,716

(22) PCT Filed: Jul. 16, 2009

(86) PCT No.: PCT/FR2009/051416
§ 371 (c)(1),
(2), (4) Date: Apr. 6, 2011

(87) PCT Pub. No.: WO2010/007323
PCT Pub. Date: Jan. 21, 2010

(65) Prior Publication Data
US 2011/0176921 A1    Jul. 21, 2011

(30) Foreign Application Priority Data

Jul. 18, 2008 (FR) ...................................... 08 54906

(51) Int. Cl.
*F01D 5/30* (2006.01)
*F01D 5/00* (2006.01)
*B23P 6/00* (2006.01)

(52) U.S. Cl.
CPC ................ *B23P 6/005* (2013.01); *F01D 5/005* (2013.01)
USPC .... 416/217; 416/204 A; 29/889.1; 29/402.05; 29/402.08

(58) Field of Classification Search
USPC ............... 29/402.04, 402.05, 402.06, 402.08, 29/402.1, 402.11, 402.12, 889.1; 416/204 A, 204 R, 217, 222, 239, 248
See application file for complete search history.

(56) References Cited

U.S. PATENT DOCUMENTS 2,738,126 A * 3/1956 Edwards ........................ 416/215
4,953,777 A * 9/1990 Griffith et al. ................. 228/119
(Continued)

FOREIGN PATENT DOCUMENTS

EP    0 263 713    4/1988
EP    1 445 426    8/2004
(Continued)

OTHER PUBLICATIONS

International Search Report Issued Dec. 10, 2009 in PCT/FR09/051416 filed Jul. 16, 2009.

*Primary Examiner* — Edward Look
*Assistant Examiner* — Christopher R Legendre
(74) *Attorney, Agent, or Firm* — Oblon, Spivak, McClelland, Maier & Neustadt, L.L.P.

(57) ABSTRACT

A method of repairing or of reworking a turbomachine disk including, on its rim, at least one external radial tab with an axial bore to accept an axial pin including a head and a shank with a threaded portion, the pin being slipped into the bore such that the head comes to press against one face of the tab through tightening of a nut on to the shank with the threaded portion against the opposite face of the tab, the pin forming a retaining mechanism to keep a tab secured to a component attached to the rim. A spot face is machined in the tab around the bore corresponding to a wearing zone, and a replacement pin including a flange pressing against the surface of the spot face, of a diameter greater than that of the head, is fitted.

12 Claims, 1 Drawing Sheet

(56) References Cited

U.S. PATENT DOCUMENTS

| | | | |
|---|---|---|---|
| 5,007,800 A * | 4/1991 | Hacault et al. | 416/220 R |
| 5,277,548 A * | 1/1994 | Klein et al. | 416/193 A |
| 6,447,250 B1 | 9/2002 | Corrigan et al. | |
| 6,447,255 B1 * | 9/2002 | Bagnall et al. | 416/245 R |
| 6,887,043 B2 * | 5/2005 | Dix et al. | 416/94 |
| 7,063,505 B2 * | 6/2006 | Czachor | 415/209.4 |
| 7,163,375 B2 * | 1/2007 | Queriault et al. | 416/193 A |
| 7,766,574 B2 * | 8/2010 | Maffre | 403/337 |
| 8,162,616 B2 * | 4/2012 | Belmonte et al. | 416/220 R |
| 8,277,188 B2 * | 10/2012 | Belmonte | 416/193 R |
| 2005/0063826 A1 * | 3/2005 | Queriault et al. | 416/204 R |
| 2008/0226457 A1 * | 9/2008 | Belmonte | 416/219 R |
| 2011/0176921 A1 * | 7/2011 | Gignoux et al. | 416/204 A |
| 2011/0243744 A1 * | 10/2011 | Forgue et al. | 416/204 A |
| 2012/0301286 A1 * | 11/2012 | Boletis et al. | 415/200 |

FOREIGN PATENT DOCUMENTS

| | | |
|---|---|---|
| EP | 1 462 664 | 9/2004 |
| EP | 1 503 039 | 2/2005 |
| EP | 1 589 189 | 10/2005 |
| FR | 2844562 A1 * | 3/2004 |
| FR | 2 922 588 | 4/2009 |
| FR | 2926613 A1 * | 7/2009 |

* cited by examiner

US 8,864,472 B2

METHOD OF REPAIRING OR REWORKING A TURBOMACHINE DISK AND REPAIRED OR REWORKED TURBOMACHINE DISK

BACKGROUND OF THE INVENTION

1. Field of the Invention

The present invention relates to a method of repairing or reworking radial mounting tabs on the rim of turbomachine disks. It is aimed in particular at the retaining lugs and, more particularly still, at the so-called central retaining lugs that hold inter-blade platforms on a fan disk in a multiple-flow turbojet engine.

2. Description of the Related Art

A known double-flow or turbofan engine, like those of the CFM 56 family, comprises a front fan driven by the low-pressure turbine of the associated gas generator. The fan disk comprises a rim around the periphery and in which substantially axially oriented cavities are machined and is secured downstream to a low-pressure compressor drum for the primary flow fed into the gas generator. The disk and the drum form the low-pressure compressor module. The cavities are of dovetail cross section and act as housings for the fan blade roots. The rim also supports inter-blade platforms which delimit the radially inner wall of the duct for the flow of air passing through the fan. The terms axial and radial, inner and outer, upstream and downstream are defined, in this text, with respect to the axis of the engine on which the various denoted components are mounted and with respect to the direction of the gaseous flow passing through this engine.

Each platform comprises a plate of elongate shape which presses laterally against the adjacent fan blades with, on its inner face, means of attachment to the rim and to the drum which are formed of inner radial tabs each pierced with an axial bore. The rim and the drum comprise means of attachment of the platforms, these means being formed of radial tabs through which there pass axial pins and a head of which projects with respect to the tab through which it has passed. More specifically, the platforms are centered and retained by the fixing means at three fixing points on the low-pressure compressor module. Two of these fixing points are situated on the fan disk and the third, which is further downstream, can be found on the low-pressure drum. The inner radial tabs of the platforms are slipped onto the heads of the pins which are secured to the rotor.

One example of a fan rotor arrangement with inter-blade platforms retained by inner radial tabs on a fan disk, at three points of attachment one of which is arranged centrally between an upstream retaining means and a downstream retaining means is described in U.S. Pat. No. 6,447,250.

When the engine is running, the platform retaining zones are subjected to high radial loads.

The present Applicant has, in Patent EP 1 503 039, described an inter-blade platform for a turbojet engine fan disk equipped with at least one first fixing tab provided with an orifice through which a fixing pin intended to connect it to a second fixing tab of the disk can pass; the fixing pin comprises a shank with a threaded portion having a first diameter and a second part comprising a flange extending the first part, having a second diameter greater than the first diameter, and intended to be interposed between the first and second fixing tabs, and a head extending the first sub-part and having a third diameter smaller than the second diameter so that it can pass through the orifice in the first fixing tab. An arrangement such as this allows a better distribution of load between the pins and the fixing tabs. However, it involves altering the geometry of the components currently used and cannot be used as a substitute for the components. Further, that document neither discloses nor suggests any repair method.

In one type of engine, the pins comprise a head and a shank with a threaded portion. The head has a shoulder pressing against the upstream face of the outer radial tab of the rim. The force with which the head presses against the surface comes as a result of the tightening of a nut which is screwed onto the shank with a threaded portion against the opposite face. It may be found that the central zone of attachment between the outer radial tab for attachment to the rim, positioned between the upstream and downstream fixing means, and the radially internal central fixing tab of the platform is susceptible to wear and to the onset of cracking. Such damage can be explained by the tiny movements of the retaining pin during operation. This pin is slipped into the bore of the outer radial tab of the rim and as mentioned hereinabove is held therein by screw-fastening. However, the force with which the pin is tightened is limited by the mechanical strength of its working cross section. The centrifugal forces experienced during operation may exceed the level of tightening and cause such movements. These movements cause wearing of the tab at the site where the head of the pin is in contact with and presses against it. In addition, cracking of the tab at the entrance to the bore accommodating the retaining pin has been noticed.

BRIEF SUMMARY OF THE INVENTION

The Applicant has set itself the objective of developing a method of repairing turbomachine disks provided with outer radial tabs and with pins for retaining components such as inter-blade platforms and which exhibit this type of wear and/or cracking.

According to the invention, the method of repairing a turbomachine disk comprising, on it's rim, at least one external radial tab with an axial bore to accept an axial retaining pin comprising a head and a shank with a threaded portion, the pin being slipped into the bore in such a way that the head comes to press against one face of the tab through the tightening of a nut on to the shank with threaded portion against the opposite face of the tab, said pin forming a retaining means to keep a tab secured to a component attached to the rim, is characterized in that a spot face is machined in the tab around the bore corresponding to the wearing zone, and a replacement pin comprising a flange pressing against the surface of said spot face, of a diameter greater than that of the head is fitted, the thickness of the flange being equal to the depth of the spot face.

The method of the invention makes it possible not only to repair components without having to alter their arrangement, something which EP 1 503 039 does not teach, but also to improve the resistance to wear by providing enlarged contact surface areas.

Because of the presence of cracks, the method also involves the enlarging of the bore by machining so as to eliminate the cracked material. According to one embodiment of the invention, the enlargement is of the order of 25%. The replacement pin having a shank with a threaded portion of a diameter greater than that of the initial retaining pin and corresponding to that of the new bore. The shank comprises a plain part and a threaded part. The plain part guides the pin in the bore over its entire length and its diameter is matched to that of the bore in order to ensure a sliding contact.

By increasing the diameter of the shank with threaded portion, the nut can be tightened more firmly onto the pin. As a result, centrifugal forces do not cause the pins to shift laterally in operation.

Because of the improved resistance to wear and to fatigue, the present method can be implemented for reworking radial retaining tabs on a disk that is new or before any one of the abovementioned forms of damage has been noticed. The objective then is to increase the potential life of the disk. This increase is substantial, of the order of 50%.

Depending on the means available and on the conditions of appearance of the zones exhibiting fretting and cracking damage, the spot face machined is either in the shape of a U opening onto the outer edge of the outer fixing tab or alternatively is in the shape of an L opening onto the outer and lateral edges of the tab or even of circular shape machined around the bore in the tab.

Although the invention applies to all situations in which these same problems arise, it is more specifically applicable to the central retaining tab of an inter-blade platform in a turbojet engine fan disk.

The invention also relates to a turbomachine disk obtained following repair or alternatively by reworking, and comprising, on its rim, at least one outer radial fixing tab provided with an axial pin comprising a head pressing against a first face of the tab and a shank with a threaded portion onto which a tightening nut is screwed on the opposite face of the tab, characterized in that the head comprises a flange of a diameter greater than that of the head itself, pressing against said first face, the flange being contained in a spot face of the tab.

The invention finally covers a turbojet fan rotor comprising a disk, inter-blade platforms comprising inner radial tabs retained by said pins.

BRIEF DESCRIPTION OF THE SEVERAL VIEWS OF THE DRAWINGS

The present invention is described in greater detail but nonlimitingly hereinafter, with reference to the drawings in which.

DETAILED DESCRIPTION OF THE INVENTION

Figure 1:
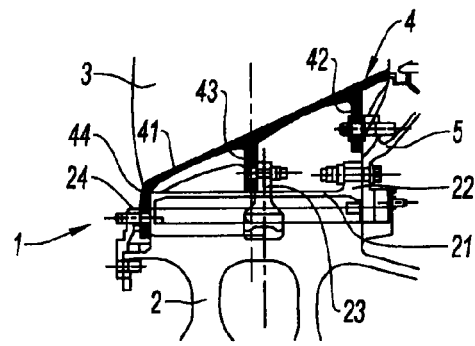
FIG. 1 is a partial axial cross section through a fan disk according to one way of attaching platforms according to the prior art and without repair or rework.
Figure 2:
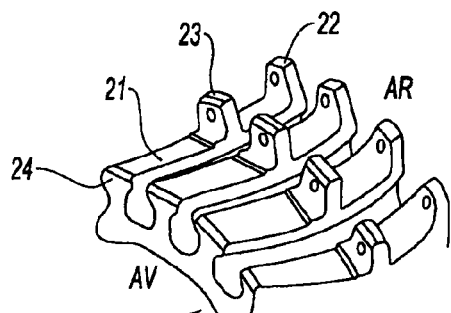
FIG. 2 is a partial perspective view of the disk of FIG. 1, alone, without the platforms and the blades.

FIG. 1 illustrates a setup as currently used on engines in operation at the present time. The fan rotor 1 comprises a disk 2 on the rim of which the roots of the fan blades 3 are housed. The housings consist of cavities of slightly curved shape oriented in the axial direction. The disk 2 is secured by bolting to the drum 5 of the booster compressor. Together these form the low-pressure compressor module. Between the cavities, the rim forms ribs 21 which comprises outwardly facing radial tabs situated in a plane that is transverse with respect to the axis of the machine: a downstream tab 22 via which the disk 2 is bolted to the drum 5, a radial tab 23, between an upstream face 24 of the disk and the downstream edge, and termed the central tab. This part of the rim of the fan disk can be seen in perspective in FIG. 2.

The platform 4 is positioned between two adjacent blades 3 and presses against their lateral faces. The platform comprises a plate 41 the upper face of which defines the inner wall of the duct for the air passing through the rotor. The platform is inclined from the upstream direction downstream, in order to follow the reduction in cross section of the air duct. Three tabs 42, 43 and 44 extend radially and transversely from the opposite face of the plate. The tabs are pierced in the axial direction and used for fixing the platform to the rotor by axial engagement with the disk fixing means. The upstream tab 44 is held against the upstream face of the disk by an upstream bolt. The downstream tab 42 is held by a downstream pin which is secured to the upstream face of the drum.

Figure 3:
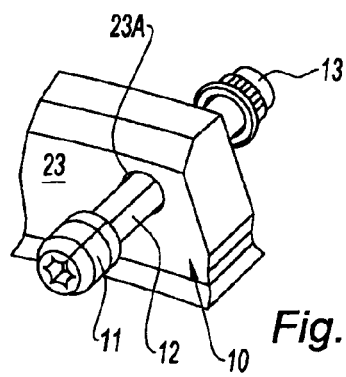
FIG. 3 is a perspective depiction of the fitting of a conventional retaining pin.

Between the two, upstream and downstream, tabs, the central tab 23 is held radially by an axial pin 10 which is itself fixed by screw-fastening. FIG. 3 shows a conventional pin such as this in the process of being fitted to the central tab 23 of the disk rim. The pin 10 comprises a head 11 and a shank with a threaded portion 12 which is slipped into an axial bore 23A machined in the central tab 23. To fix the pin, the nut 13 is screwed, downstream, onto the shank having a threaded portion until the shoulder of the head 11 comes to press against the upstream face of the tab 23. When the platform is being mounted, the tab 23 is positioned facing the head 11 of the pin and is engaged over and slipped onto this head via its orifice at the same time as the downstream tab is being fitted onto the downstream pin.

After running for a certain length of time, traces of wear appear on the upstream face of the tab 23 which is the face that accepts the shoulder of the pin. Radial cracks also appear at the entrance to the bore.

According to the invention, in order to repair this damage or prevent it from occurring, a spot face is machined on the surface of the tab which accepts the head of the retaining pin.

Figure 4B:
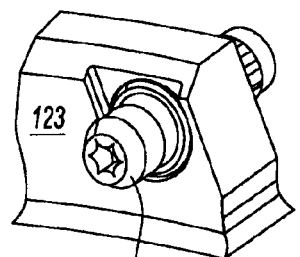
FIGS. 4a and 4b show the implementation of the repair according to the invention.
Figure 4A:
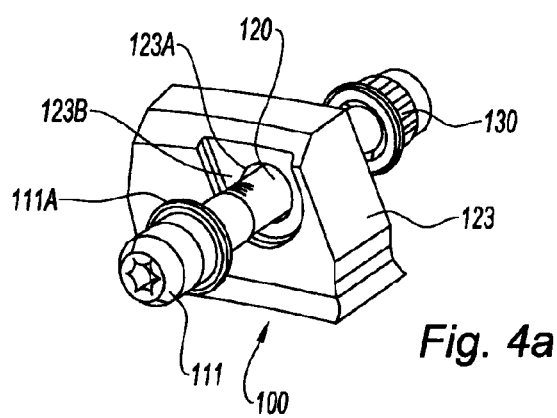

FIG. 4a depicts, in partial perspective, a tab 123. This is secured to the rim of a turbomachine disk, not depicted. A U-shaped spot face 123B has been machined on the face of the radial fixing tab 123. In this instance, this is the upstream face of the central tab for retaining a platform on the rim of the fan disk of a turbojet engine. The spot face opens onto the free upper edge of the tab 123.

Moreover, and should that prove necessary, the bore 123A is machined out in such a way as to increase its diameter. The increase in diameter performs two functions: it eliminates the cracked zones or zones in which cracks are likely to occur, and it allows the fitting of a pin the shank of which is of a larger diameter than the initial pin and allows firmer tightening onto the fixing tab 123. In addition, the nut has an enlarged base by comparison with the initial nut, and this makes it possible to avoid peening of the nut and a reduction in the life of the solution. The plain part of the shank that has a threaded portion and the bore are assembled as a "close sliding fit", that is to say a minimal, positive, clearance for example of a few micron, between them.

A pin 100 is in the process of being mounted on the tab 123 in the bore 123A. The head 111 of the pin is of a diameter greater than that of the shank 120 which is threaded over at least part of its length. The head 111 forms a flange 111A at its base so as to increase the surface area for pressing against the tab 123. The diameter of the head remains, for its part, matched to the bore of the fixing tab on the platform to be fitted. The thickness of the flange is at most equal to, and preferably is equal to, the depth of the spot face so that the repair has no impact on the adjacent components. The depth of the spot face is limited to a value which does not lead to any significant reduction in the life of the disk through weakening of the tabs. If such a value were to be exceeded, the losses would be greater than the improvement in life.

On the opposite face, a nut is fitted onto the threaded part of the shank so as to tighten the pin onto the tab 123.

In FIG. 4b, the pin 111 has been fitted. The head with its flange is pressing against the upstream face of the fixing tab. The thickness of the flange and the depth of the bore are designed so that the flange does not protrude above the surface of the tab 123.

Figure 5:
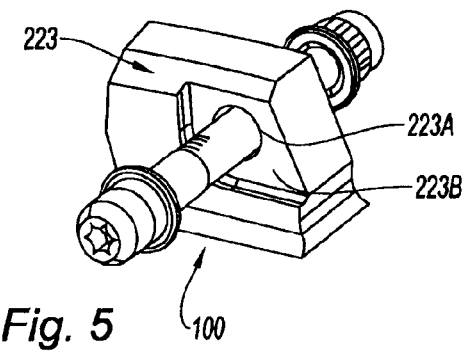
FIG. 5 shows an alternative embodiment of the spot face according to the invention.

FIG. 5 depicts an alternative embodiment of spot face. The spot face 223B is in the shape of an L and opens onto the lateral face of the tab, referenced 223 here, and onto the upper edge. As in the previous embodiment, the bore 223A is machined out if need be.

Figure 6:
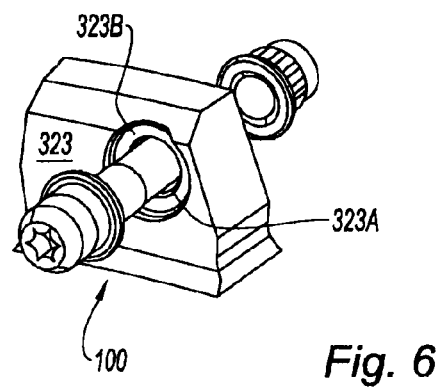
FIG. 6 shows another alternative form of embodiment of the spot face according to the invention.

FIG. 6 depicts another embodiment of bore. The bore 323B is of circular shape and forms a housing fitted to the diameter of the flange 111A of the pin. As in the preceding instances, the bore 323A is machined out so as to allow, if need be the fitting of a pin of which the shank with a threaded portion is of a diameter greater than that of the initial retaining pin. The assembly is a close sliding fit.

The choice of spot face geometry is dependent on numerous factors including the typology of the fretting and the size of the cracks.

To sum up, the invention makes it possible:
- to eliminate or avoid traces of fretting on the faces on which the pins press,
- to eliminate or avoid cracked zones at the entrance to the bore, and, by boring it out, the use of a pin of larger working cross section, should that prove necessary.

Increasing the diameter of the pin decreases both the movement under load, eliminating the risk of fretting, and the level of stress with an increase in the life at the start of the critical zone and a reduction in the rate of propagation of cracks.

The invention claimed is:

1. A method of repairing or of reworking a turbomachine disk including, on its rim, at least one external radial tab including an axial bore to accept an axial pin including a head and a shank with a threaded portion, the pin being slipped into the bore such that the head comes to press against one face of the tab through tightening of a nut on to the shank with a threaded portion against the opposite face of the tab, the pin forming a radial retaining system to keep a tab secured to a component attached to the rim, the method comprising:
   identifying a wearing zone on a radial surface of the tab;
   machining a spot face in the tab around the bore corresponding to the wearing zone so as to remove the wearing zone;
   enlarging the bore by machining to eliminate cracked material to make a new bore; and
   fitting a replacement pin including a flange pressing against a surface of the spot face, of a diameter greater than that of the head, the replacement pin including a shank with a threaded portion of a diameter corresponding to that of the new bore.

2. The method as claimed in claim 1, wherein a thickness of the flange is at most equal to a depth of the spot face.

3. The method as claimed in claim 1, wherein the enlargement is of the order of 25%.

4. The method as claimed in claim 1, wherein the nut is replaced with a second nut comprising a base that is enlarged by comparison with the nut.

5. The method as claimed in claim 1, wherein the spot face machined is in a shape of a U opening onto an exterior edge of the tab.

6. The method as claimed in claim 1, wherein the spot face machined is in a shape of an L opening onto outer and lateral edges of the tab.

7. The method as claimed in claim 1, wherein the spot face machined is circular and machined around a bore in the tab.

8. The method as claimed in claim 1, wherein the tab retains a central retaining tab of an inter-blade platform in a turbojet fan disk.

9. A turbomachine disk comprising, on its rim:
   at least one outer radial fixing tab comprising an axial pin comprising a head pressing against a first radial face of the tab and a shank with a threaded portion onto which a tightening nut is screwed on the opposite radial face of the tab,
   wherein the head comprises a flange of a diameter greater than that of the head itself, pressing against the first radial face, the flange being contained in a spot face of the tab, the spot face being machined in an identified wearing zone on the first radial face of the tab,
   wherein the spot face opens onto a free upper edge of the tab.

10. The turbomachine disk as claimed in claim 9, wherein a thickness of the flange is at most equal to a depth of the spot face.

11. A turbojet fan rotor comprising:
   a disk as claimed in claim 9; and
   inter-blade platforms comprising inner radial tabs retained by the pins.

12. A turbomachine comprising a fan rotor as claimed in claim 11.

* * * * *